United States Patent [19]
Hayes et al.

[11] Patent Number: 5,440,707
[45] Date of Patent: Aug. 8, 1995

[54] INSTRUCTION AND DATA CACHE WITH A SHARED TLB FOR SPLIT ACCESSES AND SNOOPING IN THE SAME CLOCK CYCLE

[75] Inventors: Norman M. Hayes, Sunnyvale, Calif.; Adam Malamy, Winchester, Mass.; Rajiv N. Patel, San Jose, Calif.

[73] Assignee: Sun Microsystems, Inc., Mountain View, Calif.

[21] Appl. No.: 875,692

[22] Filed: Apr. 29, 1992

[51] Int. Cl.[6] .............................................. G06F 12/10
[52] U.S. Cl. ............................... 395/403; 364/DIG. 1
[58] Field of Search ................................ 395/425, 400

[56] References Cited

U.S. PATENT DOCUMENTS

| | | | |
|---|---|---|---|
| 4,953,930 | 9/1990 | Ramsey et al. | 395/118 |
| 5,119,485 | 6/1992 | Ledbetter, Jr. et al. | 395/425 |
| 5,222,222 | 6/1993 | Mehring et al. | 395/400 |
| 5,317,711 | 5/1994 | Bourekas et al. | 395/425 |
| 5,335,335 | 8/1994 | Jackson et al. | 395/425 |

Primary Examiner—Jack B. Harvey
Assistant Examiner—Michael A. Whitfield
Attorney, Agent, or Firm—Blakely Sokoloff Taylor & Zafman

[57] ABSTRACT

A caching arrangement which can work efficiently in a superscaler and multiprocessing environment includes separate caches for instructions and data and a single translation lookaside buffer (TLB) shared by them. During each clock cycle, retrievals from both the instruction cache and data cache may be performed, one on the rising edge of the clock cycle and one on the falling edge. The TLB is capable of translating two addresses per clock cycle. Because the TLB is faster than accessing the tag arrays which in turn are faster than addressing the cache data arrays, virtual addresses may be concurrently supplied to all three components and the retrieval made in one phase of a clock cycle. When an instruction retrieval is being performed, snooping for snoop broadcasts may be performed for the data cache and vice versa. Thus, for every clock cycle, an instruction and data cache retrieval may be performed as well as snooping.

17 Claims, 3 Drawing Sheets

INSTRUCTION AND DATA CACHE WITH A SHARED TLB FOR SPLIT ACCESSES AND SNOOPING IN THE SAME CLOCK CYCLE

BACKGROUND OF THE INVENTION

1. Related Application

This application is related to co-pending application 07/875,353 titled "Method and Apparatus for Grouping Multiple Instructions, Issuing Grouped Instructions Simultaneously, and Executing Grouped Instructions in a Pipelined Processor" filed concurrently herewith and assigned to the assignee of the present invention.

2. Field of the Invention

The present invention relates to data processing systems utilizing cache memories, and more particularly, to multiprocessor based systems capable of executing multiple instructions per clock cycle. A cache organization for such a system is proposed.

ART BACKGROUND

Caches are used in computer systems to speed the overall operation of the system. The theory of a cache is that a system attains a higher speed by using a small portion of very fast memory as a cache along with a larger amount of slower main memory. The cache memory is usually placed operationally between the data processing unit or units and the main memory. If data and instructions are called from main memory and placed in cache memory as they are required by the program, the system looks first to the cache memory to see if the information required is available in the cache. Consequently the system will usually find the information desired in the cache memory and will operate at a speed as though the memory were made of mostly high speed cache memory. This results because of statistical temporal locality; information in any particular portion of a process which has just been used is likely to be subsequently utilized again.

Numerous caching arrangements have been developed to increase the efficiency of using cache memory. One approach is to use two caches for each data processing unit, one for storing recently used instructions and one for storing recently accessed data. Also associated with cache memories may be an even smaller memory array for storing tag information relating to the data stored in the cache. The addresses stored in the tag array are the addresses from the main memory which have data corresponding to the data or instructions held in the cache associated with the tag array. When a retrieval request is made for information at a particular address, the address is compared with the addresses in the tag array. If the address matches an address in the tag array, the information is accessed from the cache memory; if not, then the main memory is accessed for the information which is then substituted into the cache memory for use by the data processing unit. One such arrangement is disclosed in U.S. Pat. No. 4,969,122 which discloses an apparatus for page tagging in a computer system and which is assigned to the assignee of the present invention.

Because many processors now use virtual addressing for running processes, a decision in designing a cache arrangement is whether to maintain a virtual address cache or a physical address cache. Using a virtual address cache eliminates the need to translate the virtual address issued into a physical address. That is because the virtual addresses of the process will correspond to the addresses stored in the tag array. However, when each new process utilizes the cache, the cache memories will have to be flushed because the virtual addressing will be different even if the same data and instructions are being used.

Physical addressing requires storing addresses in the tag array corresponding to the physical address in the main memory of the desired data or instructions. When new processes are started and new virtual addresses are created, the data and instructions will still reside in the same locations in the main memory and no flushing of a cache is required because the cache tag array will have those physical addresses stored. The disadvantage to physical addressing for cache data is that the virtual addresses being used by the process will have to be translated into a physical address. This translation will be carried out in some form of a memory management unit which maintains a translation lookaside buffer (TLB). The TLB will maintain the cross references for the virtual addresses of a given process with their associated physical addresses in the main memory. Traditionally, the time required to carry out this translation has been an additional clock cycle for each reference to the cache. Typically, in a first clock cycle the virtual address is translated into a physical address and on a next clock cycle, the physical address is compared to the addresses stored in the cache to determine if the desired instruction or data is present in the cache. This additional cycle for translation can have a tremendous slowing effect upon the system.

Modern computing systems have seen the advent of the use of multiple processors as an efficient means of increasing the speed of data processing. Each processor in a multiprocessing systems may have associated instruction and data caching arrangements as discussed above. A concern that develops due to the use of multiple processors with independent caching is that two or more caches may have stored in them data from the same block of main memory. The coherency of the data being stored in these caches must be maintained. The coherency problem is to make sure a processor has exclusive access to write an object and has the most recent copy when reading an object. Every cache that has a copy of the data from a block of physical memory also has a copy of the information about it. These caches are usually coupled to a shared memory bus and each cache must monitor or snoop on the bus to determine whether or not the cache has a copy of the shared block. On a read miss, all caches check to see if a copy of the requested block is in the cache and may take the appropriate action such as supplying the data to the cache that missed. More importantly, on a write, each cache determines if a copy is in the cache and then acts, either to invalidate the copy or to change the copy to the new value.

To effectively maintain cache coherency, it is desirable to detect for a snoop each clock cycle. In the past, there have been two approaches to dealing with a detected snoop. One is to maintain two tag arrays for each portion of data cache, one that is updated in accordance with the snoop and the other for addressing the data. The other approach has been to detect a snoop and then stall the processor while the cache is updated. Both of these approaches suffer the disadvantage of either requiring excessive overhead or unfavorable slowing of the system.

These disadvantages are compounded in a superscaler type system in which multiple instructions may be sent during each clock cycle. When a snoop is detected in a system which executes more than one instruction per clock cycle, a stall results in the loss of not one instruction for that cycle but two or three or potentially more, depending on the number of instructions per clock cycle the system is capable of propagating.

For further description of caching, see J. L. Hennessy and D. A. Patterson, *Computer Architecture A Quantitative Approach,* Morgan Kaufmann Publishers, Inc., 1990.

SUMMARY OF THE INVENTION

It is an object of the present invention to improve and speed the operation of computer systems utilizing cache memories.

It is an object of the present invention to provide a caching arrangement compatible and able to take advantage of a multiple-instruction-per-cycle system.

It is an object of the present invention to provide a caching arrangement in a virtual memory system whereby data and instruction cache retrievals are physically addressed and are performed in a single clock cycle.

It is further an object of the present invention to provide a system which can snoop and update during each clock cycle to maintain coherency without causing a stall or requiring a second tag array.

These and other objects of the present invention are realized by a caching arrangement for use with a computer system which has an associated instruction cache and data cache for each of a plurality of processors. Each component of the caching arrangement will be double pumped in such a manner as to complete both a translation, compare and data retrieval as well as a snoop during each clock cycle. The system takes advantage of the fact that the relative speeds of the various components within the caching arrangement are such that a translation and data retrieval may be performed concurrently because the translation will occur faster, providing for selection even as the data is addressed in case there is a hit. Such a system increases the number of operations that may be executed each cycle and decreases the number of times the processor will have to be stalled.

The caching arrangement of the present invention provides for a translation lookaside buffer (TLB) to be shared by both a data cache and an instruction cache. Each cache includes a tag array and a data array. On one phase of a clock cycle, a virtual address composed of a page identifier and an offset is supplied to the TLB and one of the cache tag arrays and its associated data array. On the succeeding phase of the clock cycle another virtual address is supplied to the TLB and to the other tag array and associated data array, thus providing for retrievals from both caches in two phases of a clock cycle. On alternating phases when one cache is being addressed, the other is free to process detected snoops.

BRIEF DESCRIPTION OF THE DRAWINGS

The objects, features and advantages of the present invention will be apparent from the following detailed description in which.

NOTATION AND NOMENCLATURE

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. The algorithms presented herein are not inherently related to any particular computer or other apparatus.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention describes apparatus and method steps for operating a computer in processing electrical or other (e.g., mechanical, chemical) physical signals to generate other desired physical signals.

DESCRIPTION OF THE PREFERRED EMBODIMENT

Figure 1:
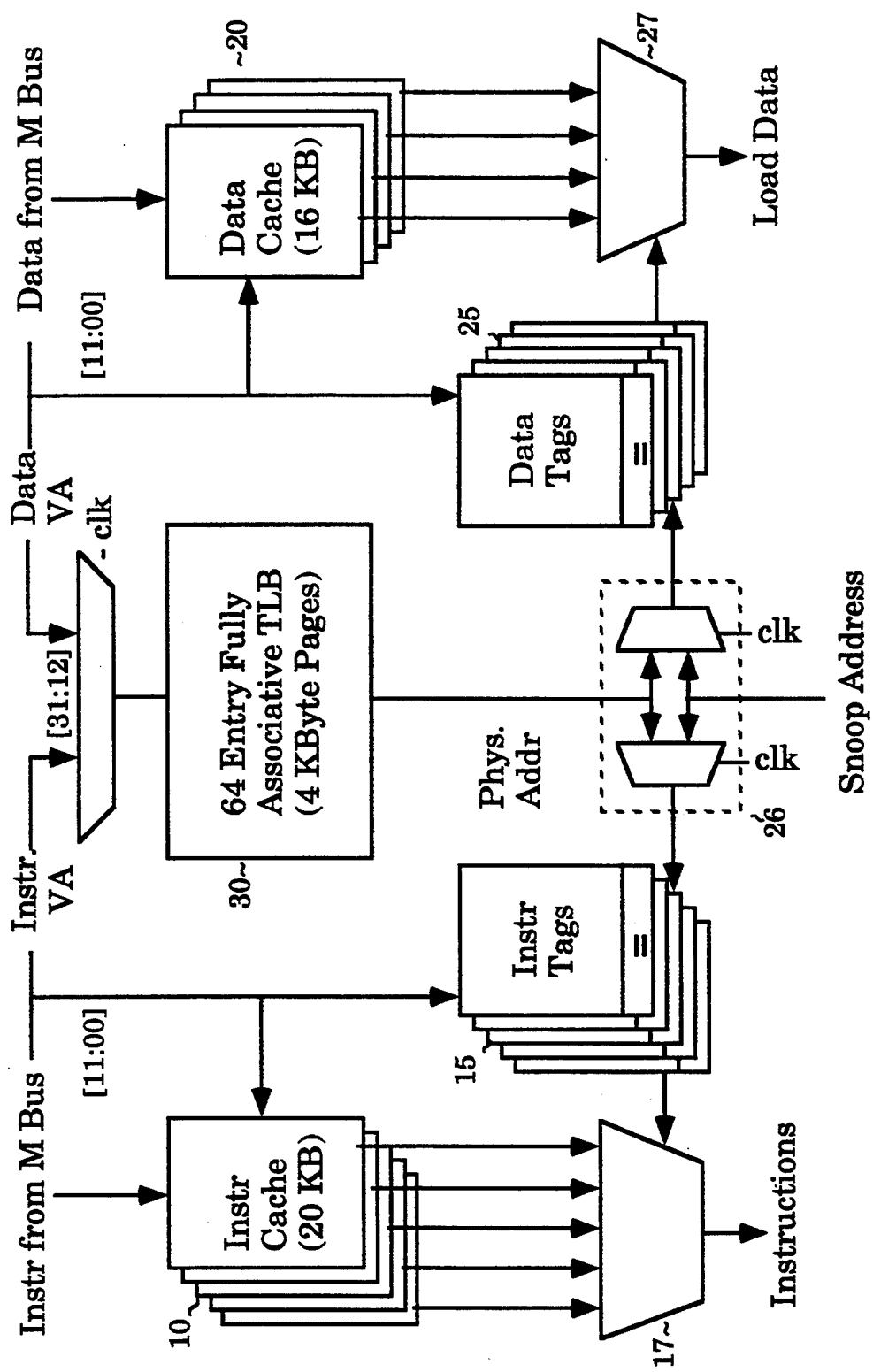
FIG. 1 is a block diagram of the caching hardware arranged in accordance with a preferred embodiment of the present invention.

Referring first to FIG. 1, a block diagram of the caching arrangement in accordance with a preferred embodiment of the present invention is shown. In this embodiment, an instruction cache 10 and a data cache 20 are maintained separately. The instruction cache 10 is a 5-way associative cache comprising five pages of memory where each page is 4 kilobytes (KB). Each page maintains 64 blocks of 64 bytes of instruction information from the main memory. Associated with the instruction cache array 10 is an instruction tag array 15. Each page of the instruction tag array 15 maintains 64 lines of addresses. The instruction tag array 15 and instruction cache array 10 are related such that, for example, the tenth line of the first page of the instruction tag array contains the corresponding physical address in the main memory of the tenth block of the first page held in the instruction cache array. For each block of data in the instruction cache array 10 a corresponding line in the instruction tag array 15 contains the physical address of the main memory location corresponding to that block of data.

The data cache array 20 also comprises 4 KB pages arranged in 128 blocks of 32 bytes per page. In the preferred embodiment, the data cache is 4-way associative. Related to the data cache array 20 is the data tag array 25. As with the instruction tag array 15, the data tag array maintains the physical addresses corresponding to the main memory locations of the blocks of data held in the data cache array 20. In FIG. 1, the tag arrays are shown as independent components from the cache data arrays, however, they may reside in the same memory device.

Because the addresses stored in the tag arrays represent the physical addresses in the main memory of the blocks of data, and because each process when running utilizes virtual addresses, it is necessary to translate the virtual addresses supplied by the processor in order to retrieve data from the caches. Accordingly, there is supplied in the preferred embodiment arrangement a 64 entry fully associative translation lookaside buffer (TLB) 30. For a process running, the TLB 30 maintains a cross reference of the active virtual addresses with the actual physical addresses. The preferred embodiment TLB 30 is maintained as a 4 KB page. When a new process is initiated, the cross-reference addresses in the TLB are updated to correspond to the new virtual addresses being used. The physical addresses stored in the cache tag arrays do not change so it is unnecessary to flush the cache data.

When a processor associated with a given cache seeks to retrieve an instruction or data block, the cache is first checked by supplying to the caching arrangement a 32 bit address. The 32 bit address that is sent by the processor is a virtual address generated by the running process corresponding to a physical address in the main memory. Because the caches are physically addressed, it is necessary to translate the virtual address supplied in order to retrieve from the cache the desired block of memory. Traditionally, it was necessary to first translate the virtual address before beginning the retrieval operation. However, the present invention exploits a physical effect of the relative sizes of the cache arrays, tag arrays and the TLB. Before this exploitation can be explained, it is first necessary to describe how the virtual address supplied by the processor is organized.

Figure 2:
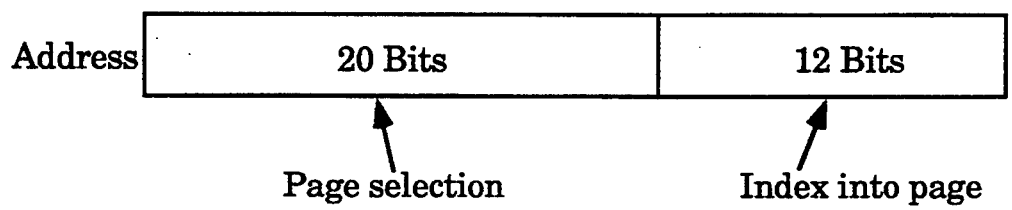
FIG. 2 is a representation of the arrangement of the data bits forming a running processes virtual address.

FIG. 2 shows a block diagram of a 32 bit virtual address of the type which would be conveyed from a processor to its cache for retrieval. The address can be seen as being composed of two parts. The first 20 bits will represent the virtual address for selecting a page of the main memory. The lower order 12 bits represent an index into the selected page for finding a desired block of data. This lower order 12 bits will not be translated when translating from the virtual address to the physical address. That is, the virtual address of the page will be translated to a physical address for the page in the main memory but the 12 bits indexing where in the page to look will remain the same. Thus, it is only the higher order 20 bits which must be translated by the TLB 30 to determine the higher order 24 bits of the address representing the physical address of the desired block. Regardless of the page that is needed, the lower order 12 bits tell us where in that page the desired data is stored.

Therefore, addresses are supplied in parallel to the TLB 30, data or instruction cache array and corresponding tag array, depending on which is being retrieved. For example, when the processor sends a 32 bit virtual address to retrieve a block of instruction information, the method of retrieval from the cache, if it is present in the cache, is the following: the higher order 20 bits representing the virtual address to the page are supplied to the TLB 30 for translation, while the lower order 12 bits representing the index into the given page are supplied to the instruction cache array 10 and the instruction tag array 15. In the preferred embodiment, it does not matter that it is unknown whether the desired block of data is in the instruction cache array 10. While it appears that an attempt is being made to retrieve the page and translate the page address concurrently, in fact, there is a physical effect which results from the relative sizes of the TLB 30, the instruction tag array 15 and the instruction cache array 10.

Because the TLB 30 is the smallest of the three arrays, it is capable of translating the 20 bit virtual page address into a 24 bit physical page address in approximately 9 nanoseconds. The lower order 12 bits supplied to the instruction tag array 15 corresponds to the position in the tag array which holds the physical address of the data held in the cache array. Because of the size of the tag array, it takes approximately 11 nanoseconds to determine the physical address stored at the location determined by the 12 bit index. Because it takes the tag array longer than it takes the TLB 30 to perform its translation, the 24 bit physical page address corresponding to the 20 bit virtual page address will already be supplied to the tag array for comparison to the physical page addresses stored in the tag array.

The translated physical page address will be compared to the physical page addresses on each page of the instruction tag array at the location indicated by the 12 bit index. If one is equivalent, then there is a hit indicating that the instruction data stored in the corresponding page of the cache array is the same as the data in the main memory that was sought to be retrieved with the supplied virtual address.

Because of the size of the instruction cache array 10, it takes approximately 14 nanoseconds for the 12 bit indexing address to select the desired location on a page of the cache array. Since this takes longer than the address comparison or translation, by the time it is determined if there is a hit, the desired block can immediately be retrieved from the proper location. The MUX logic 17 is driven by the instruction tag array 15 which selects the page of the instruction cache array 10 having the desired block of data at the 12 bit index for supplying to the processor. The same procedure can be done and is done when retrieving desired data from the data cache array 20. For reasons that will be discussed further the instruction cache array 10 and data cache array 20 are capable of sharing a single TLB 30.

Since the lower order 12 bits of the virtual address do not have to be translated in order to index to a desired location in the cache data arrays, each page of he cache data arrays should have no more than $2^{12}$ locations, or 4 KB. Therefore, in order to maintain the pages of data in 4 KB blocks, the instruction and data cache arrays are 5-way associative and 4-way associative, respectively.

The implementation in the preferred embodiment of the present invention is intended to operate with a superscaler processor, that is, one where more than one instruction per clock cycle is capable of being propagated. The above operations with respect to an instruction retrieval will be carried out in one phase of a clock cycle. Likewise, a retrieval from the data cache will be performed in the other phase of a clock cycle. Therefore, for each cycle of the clock, both an instruction retrieval and a data retrieval will be carried out. This is sometimes referred to as operations being performed on the rising edge and the falling edge of the clock cycles. In the preferred embodiment, data retrievals are performed on the rising edge of each cycle and instruction retrievals are performed on the falling edge. Because the instruction and data cache operations are performed in different phases of the clock cycle, the preferred embodiment implementation is capable of using a single TLB 30 for both retrievals. On the rising edge of the cycle, it is a virtual data address that is translated by the TLB 30 which then outputs to the data tag array 25 the 24 bit physical page address for the block of data corresponding to that data. The logic 26 of the caching arrangement determines that the translated address should then be compared in the data tag array 25. On the falling edge of the clock cycle, it is a 32 bit virtual address for instruction information that is received, 20 bits of which are decoded by the TLB 30. The logic 26 then sends that translated address to the instruction tag array 15 for comparison.

Figure 3:
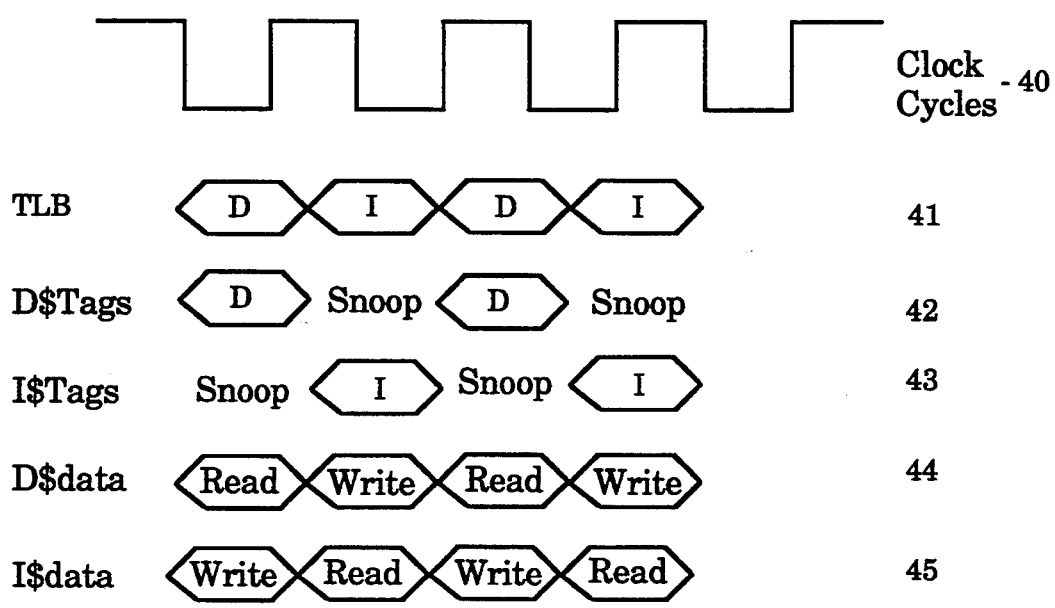
FIG. 3 is a timing diagram indicating the various operations which transpire during the alternating phases of the clock cycle.

FIG. 3 shows a timing diagram which illustrates the various operations with respect to a few clock cycles. The line 40 of the FIG. 3 illustrates several periods of the timing signal. Line 41 shows in relation to the clock cycles how upon the rising edge of a cycle, a data cache address will be processed by the TLB 30 and on the falling edge, an instruction address will be translated by the TLB 30. Line 42 of FIG. 3 shows that on the rising edge of each clock cycle, the data cache tag array 25 will receive the 12 bits of data to compare to the translated address. Likewise, line 44 of FIG. 3 shows that upon the rising edge of each cycle that a data address will be supplied to the data cache data array 20 for retrieval if there is a hit. Lines 43 and 45 of FIG. 3 show that periodic with the falling edge of the clock cycle that it is the instruction cache tag 15 and instruction cache data array 10 which are addressed for retrieval if there is a hit. There are several methods for providing more than one instruction per clock cycle. The method in accordance with a preferred embodiment of the present invention is disclosed in co-pending application titled "Method and Apparatus for Grouping Multiple Instructions, Issuing Grouped Instructions Simultaneously, and Executing Grouped Instructions in a Pipelined Processor", filed concurrently herewith and assigned to the assignee of the present invention.

Because the present invention in its preferred embodiment is intended to be employed in a multiprocessing system, there is another serious concern that must be contended with. In a multiprocessing system, it is possible, and even likely, when more than one processor is running the same program that more than one cache will have in it data from the same physical location of the main memory. It is essential that these caches remain coherent. If the data is changed in one cache, the other caches containing that data will be out of date and should not be addressed for the old data. Design considerations will dictate whether the other caches will actually copy the new data or merely invalidate their blocks in the cache and retrieve the new ones only when they need it. A compatible method for detecting and dealing with these possible incoherences without degrading processor performance.

Figure 4:
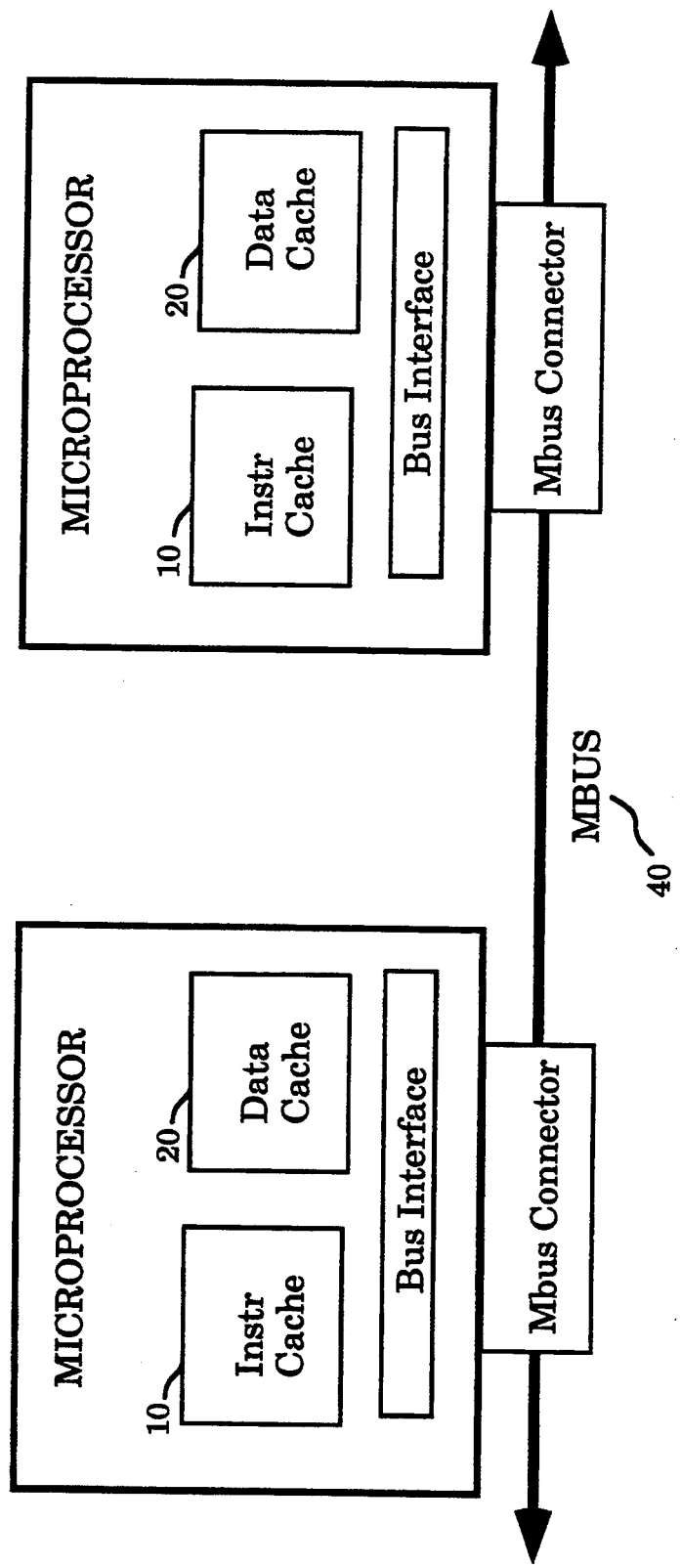
FIG. 4 is a block diagram arranged showing two processors in a multiprocessor system whereby the caches are linked by a shared memory bus.

In some prior art systems, multiple tag arrays for each cache data array are employed. Each cache is linked together by a bus shown in FIG. 4 identified as the M bus 40. When a block of data is changed in the cache associated with one microprocessor, a signal is broadcast along the M bus 40. That signal identifies which block of data has been affected. All caches which have that same block of data in them will have to either invalidate that block or rewrite it with the new value. With a second tag array, it is possible for that tag array to compare addresses coming down the M bus with the addresses in the tag array while the other tag array and cache data are left uninterrupted.

An alternative method has been to maintain one tag array. Watching for affected memory blocks in a cache is called snooping. In the single tag array arrangement, when a snoop is detected indicating a block in that cache has been changed in another cache, the processor is stalled while the cache is updated or invalidated based on the data along the M bus 40.

Because the preferred embodiment of the present invention is employed in a superscaler multiprocessing system, a novel solution has been developed. Since the instruction cache and data cache are accessed once per clock cycle on alternating phases of the clock cycle, each is left free on alternating cycles. That is, the data cache is only doing a retrieval for the processor on the rising edge of the clock cycle and is not being used on the falling edge of the clock cycle. Therefore, on the falling edge of the clock cycle, the data cache tags 25 and the data cache array 20 are capable of processing detected snoops. Likewise, on the rising edge of a clock cycle, the instruction cache is capable of processing snoops. Therefore, no cycles are lost in dealing with incoherences, and no additional tag array is necessary. Hence, in FIG. 3, lines 42 and 43 during alternating cycles from processor addressing, snooping is indicated. The logic 26, driven by the clock pulses, controls the switch between input streams to the caches; that is, between processor driven addresses and M bus snooping addresses. The clock goes into the MUXES of logic 26 which on one phase steer an address from the processor and on the other phase steer in a snoop address.

The TLB 30, the tag arrays 15 and 25 and the cache data arrays 10 and 20 are said to be double pumped. That is, each is accessed twice per cycle to provide high throughput. Prior art systems which could only process one instruction per clock cycle required higher clock rates to get higher performance. This double pumping need not be implemented on multiprocessing systems only. It will work on any single processor systems which can process more than one instruction per cycle as well.

Additionally, because the data cache and instruction cache are used only once per cycle in alternating phases, it is possible that a line fill may take place from the M bus 40 during one phase of a cycle while a read takes place during the next phase thereby allowing for concurrent line fills and cache access without stalling. This is indicated at timing lines 44 and 45 of FIG. 3. This provides for much faster caching upon a miss than is usually provided in traditional caching systems.

Although the present invention has been described in terms of a preferred embodiment, it will be appreciated that the various modifications and alterations might be made by those skilled in the art without departing from the spirit and scope of the invention. The invention should, therefore, be measured in terms of the claims which follow.

We claim:

1. In a computer system having at least one central processing unit (CPU), a clock having cycles with at least first and second phases, and a cache arrangement comprising a cache data array and a cache tag array, said computer system having a first bus for conveying virtual addresses for accessing said cache memory and a second bus for conveying other information to said cache memory, the improvement comprising:

a first cache tag array coupled to said first bus and to said second bus wherein during said first phase of said clock cycle, said cache tag array is accessed from said first bus and during said second phase of said clock cycle, said first cache tag array is available to receive a snoop address from said second bus; and a second cache tag array coupled to said first bus and to said second bus for being available to receive snoop addresses from said second bus during said first phase of a clock cycle and for accessing by said first bus during said second phase of a clock cycle;

whereby addresses from which information is to be retrieved can be processed by said first cache tag array while detected snoop address are processed by said second cache tag array and vice versa.

2. The improvement of claim 1 further comprising multiplexing logic means coupled to said clock, said first and second cache tag arrays and said second bus wherein said multiplexing logic steers detected snoop addresses from said second bus to said second cache tag array during said first phase of a clock cycle and to said first cache tag array during said second phase of a clock cycle.

3. The improvement of claim 2 wherein said multiplexing logic means comprises a first multiplexer and a second multiplexer each coupled to said clock, said first multiplexer coupled to said first cache tag array and said second multiplexer coupled to said second cache tag array.

4. A cache memory apparatus for use in a computer system, said computer system having at least one central processing unit (CPU), a clock having cycles with at least first and second phases and a main memory having a plurality of memory locations each represented by a physical address, said processing unit generating virtual addresses corresponding to said physical addresses when running a process, said computer system having a first bus for conveying virtual addresses for accessing said cache memory apparatus and a second bus for conveying other information comprising snoop addresses, instructions, and data to said cache memory apparatus, said cache memory apparatus comprising:

a translation lookaside buffer coupled to said first bus for receiving first and second virtual addresses on said first and second phases of a clock cycle, respectively, for translating said first and second virtual addresses to corresponding physical addresses;

a first cache tag array coupled to said first bus and said translation lookaside buffer for receiving lower order bits of said first virtual address during said first phase of a clock cycle concurrently with said translation lookaside buffer receiving said first virtual address, said first cache tag array using the lower order bits of said first virtual address to determine a stored physical address, said first cache tag array further being coupled to said translation lookaside buffer for receiving a translated physical address, said first cache tag array comparing said translated physical address from said translation lookaside buffer to said stored physical address located at an indexed location in said first cache tag array based on the lower order bits, for determining a cache hit, said first cache tag array also being coupled to said second bus for monitoring for snoop addresses when not being accessed from said first bus;

a first cache data array coupled to said first bus for receiving the lower order bits of said first virtual address during said first phase of a clock cycle concurrently with said translation lookaside buffer and said first cache tag array receiving said first virtual address, said cache data array outputting to said CPU data from said indexed location when said first cache tag array indicates a cache hit for said first virtual address, said first cache data array also being coupled to said second bus for receiving information when not being accessed from said first bus;

a second cache tag array coupled to said first bus and said translation lookaside buffer for receiving lower order bits of said second virtual address during said second phase of a clock cycle concurrently with said translation lookaside buffer receiving said second virtual address, said second cache tag array using the lower order bits of said second virtual address to determine a stored physical address, said second cache tag array further being coupled to said translation lookaside buffer for receiving a translated physical address, said second cache tag array comparing said translated physical address from said translation lookaside buffer to said stored physical address located at an indexed location in said second cache tag array based on the lower order bits, for determining a cache hit, said second cache tag array also being coupled to said second bus for monitoring for snoop addresses when not being accessed from said first bus; and a second cache data array coupled to said first bus for receiving the lower order bits of said second virtual address during said second phase of a clock cycle concurrently with said translation lookaside buffer and said second cache tag array receiving said second virtual address, said cache data array outputting to said CPU data from said indexed location when said second cache tag array indicates a cache hit for said second virtual address, said second cache data array also being coupled to said second bus for receiving information when not being accessed from said first bus;

wherein said first virtual address is supplied during the first phase of a clock cycle to said TLB and said first cache tag array and said first cache data array for translation and hit determination, and during the second phase of said clock cycle said second virtual address is supplied to said TLB and said second cache tag array and said second cache data array, thus allowing caching from said first and said second cache arrays during each clock cycle.

5. The cache memory apparatus of claim 4 further comprising multiplexing logic means coupled to said clock, said first and second cache tag arrays and said second bus wherein said multiplexing logic steers a snoop address, if one is detected, from said second bus to said second cache tag array during said first phase of a clock cycle and to said first cache tag array during said second phase of a clock cycle.

6. The cache memory apparatus of claim 5 wherein said multiplexing logic means comprises of a first multiplexer and a second multiplexer wherein said first and second multiplexers are coupled to receive clock signals, TLB address outputs and snoop addresses, said first multiplexer being driven to steer detected snoop addresses to said first cache tag array while said multiplexer is driven to steer the TLB outputs to said second cache tag array during said second phase of a clock cycle and said second multiplexer being driven to steer detected snoop addresses to said second cache tag array while said first multiplexer is driven to steer TLB output addresses to said first cache tag array during said first phase of a clock cycle.

7. The cache memory arrangement of claim 4 further comprising address signal multiplexing means coupled to said translation lookaside buffer, said clock and said first bus, said address multiplexing means steering either instruction or data cache virtual address during a first phase of a clock cycle to said TLB and the other type of virtual address during said second phase of a clock cycle.

8. The cache memory apparatus of claim 4 wherein said TLB address translation is faster than said cache tag array indexing which is faster than said data array indexing, whereby addresses supplied in parallel to said TLB, said tag arrays and said data arrays may be processed such that said TLB's translation reaches said tag arrays prior to said tag arrays indexing and then said tag arrays indexing reaching said data arrays prior to said data arrays indexing.

9. The cache memory apparatus of claim 4 wherein said translation lookaside buffer is a 64 entry fully associative TLB wherein each entry is 64 bytes.

10. The cache memory apparatus of claim 4 wherein said first cache tag array and first cache data array are 5-way set associative.

11. The cache memory apparatus of claim 10 wherein said first cache data array comprises at least one page, wherein a page is four (4) kilobytes in capacity, the four kilobytes comprising 64 entries of 64 bytes each.

12. The cache memory apparatus of claim 4 wherein said second cache tag array and said second cache data array are 4-way set associative.

13. The cache memory apparatus of claim 12 wherein said second cache data array comprises at least one page wherein a page is four (4) kilobytes in capacity, the four kilobytes comprising 128 entries of 32 bytes each.

14. The cache memory apparatus of claim 4 wherein said lower order bits of said first and second virtual addresses refers to a page offset which does not have to be translated because it corresponds to the page offset of a physical page address.

15. A method for caching in a superscalar microprocessor system wherein said microprocessor is responsive to clock cycles each having at least a first phase and a second phase and uses virtual addresses which have corresponding physical addresses, said caching system having a translation lookaside buffer, first and second cache tag arrays, and first and second cache data arrays both having at least one block having at least one line having low and high order bits, said method comprising the steps of:

conveying a virtual address during a first phase of a clock cycle to said translation lookaside buffer, said first cache tag array and said first cache data array;

translating in said translation lookaside buffer the higher order bits of said virtual address into a corresponding physical page address and providing said physical page address to said first cache tag array;

concurrent with said translating step, indexing to the line of said first cache tag array indicated by the lower order bits of said virtual address, said line of said first cache tag array holding a physical address of the data held in a corresponding location in said first cache data array;

concurrent with said translating step, indexing to the block of said first cache data array indicated by the lower order bits of said virtual address;

comparing said translated physical address to the physical address stored at the index line of said first cache tag array to determine if there is a cache hit;

providing access to said microprocessor said indexed block of data from said first data cache array if there is a cache hit;

conveying a virtual address during a second phase of a clock cycle to said translation lookaside buffer, said second cache tag array and said second cache data array;

translating in said translation lookaside buffer the higher order bits of said virtual address into a corresponding physical page address and providing said physical page address to said second cache tag array;

concurrent with said translating step, indexing to the line of said second cache tag array indicated by the lower order bits of said virtual address, said line of said second cache tag array holding a physical address of the data held in a corresponding location in said second cache data array;

concurrent with said translating step, indexing to the block of said second cache data array indicated by the lower order bits of said virtual address;

comparing said translated physical address to the physical address stored at the index line of said second cache tag array to determine if there is a cache hit;

providing access to said microprocessor said indexed block of data from said second data cache array if there is a cache hit;

during said first phase of said clock cycle, monitoring for a snoop address in said second cache tag array; and during said second phase of a clock cycle, monitoring for a snoop address in said first cache tag array.

16. The method of claim 15 further comprising the steps of:

during said first phase of a clock cycle writing information from a bus to said second cache data array; and during said second phase of a clock cycle writing information from said bus to said first cache data array.

17. The method of claim 16 wherein said writing steps occur concurrently with said retrieving data from the other cache.

* * * * *